(12) United States Patent
Hariri

(10) Patent No.: US 9,904,254 B1
(45) Date of Patent: Feb. 27, 2018

(54) CUSTOMIZABLE SMART WATCH AND HOUSING

(71) Applicant: Andrew Jeon Hariri, Hillsborough, CA (US)

(72) Inventor: Andrew Jeon Hariri, Hillsborough, CA (US)

(*) Notice: Subject to any disclaimer, the term of this patent is extended or adjusted under 35 U.S.C. 154(b) by 0 days.

(21) Appl. No.: 14/495,832

(22) Filed: Sep. 24, 2014

(51) Int. Cl.
| | |
|---|---|
| G04G 17/08 | (2006.01) |
| G04G 9/00 | (2006.01) |
| G04G 21/04 | (2013.01) |
| G04G 21/08 | (2010.01) |
| G04G 21/00 | (2010.01) |
| A44C 5/00 | (2006.01) |
| G06F 1/16 | (2006.01) |

(52) U.S. Cl.
CPC ............. *G04G 17/08* (2013.01); *A44C 5/00* (2013.01); *G04G 9/0064* (2013.01); *G04G 21/00* (2013.01); *G04G 21/04* (2013.01); *G04G 21/08* (2013.01); *G06F 1/163* (2013.01)

(58) Field of Classification Search
CPC ...... G04B 37/1486; A44C 5/10; G04G 21/00; G04G 21/08
USPC .............................. 368/10, 13, 14, 281, 282
See application file for complete search history.

(56) References Cited

U.S. PATENT DOCUMENTS

| | | | | |
|---|---|---|---|---|
| 4,412,751 A | * | 11/1983 | Jeannet et al. | ............... 368/276 |
| 6,158,884 A | * | 12/2000 | Lebby et al. | ................ 368/282 |
| 6,212,414 B1 | * | 4/2001 | Alameh et al. | ............ 455/575.6 |
| 6,216,490 B1 | * | 4/2001 | Radley-Smith | ..................... 63/3 |
| 6,590,835 B2 | * | 7/2003 | Farine et al. | ................... 368/10 |
| 7,203,134 B1 | * | 4/2007 | Jackson | .......................... 368/47 |
| 7,604,396 B1 | * | 10/2009 | Karterman | .................... 368/281 |
| 7,618,260 B2 | * | 11/2009 | Daniel et al. | .................. 439/37 |
| 7,946,758 B2 | * | 5/2011 | Mooring | ............. G04B 37/005 368/276 |
| 8,467,270 B2 | * | 6/2013 | Gossweiler et al. | ........... 368/10 |

(Continued)

FOREIGN PATENT DOCUMENTS

| | | | |
|---|---|---|---|
| JP | 56120972 A | * | 9/1981 |
| JP | 59183391 A | * | 10/1984 |

(Continued)

OTHER PUBLICATIONS

Kairos T Band, Apr. 26, 2015, Indiegogo Magazine, full document, retrieved Jul. 18, 2016 from <https://www.indiegogo.com/projects/kairos-t-band-smartwatch-best-of-analog-digital#>, full document.*

(Continued)

*Primary Examiner* — Amy Cohen Johnson
*Assistant Examiner* — Daniel Wicklund
(74) *Attorney, Agent, or Firm* — Haverstock & Owens LLP

(57) ABSTRACT

A customizable watch and watch housing integrates the aspects of a traditional watch with the qualities of a smart device. The customizable watch and watch housing is a universally adaptable smart watch for housing different watch faces. The user can interchange different watch faces, and the watch housing can serve the function of a smart device, a watch, and a computer. The watch housing and/or a watch band can contain an interface for controlling one or more computer executable programs stored within a memory module of the watch and a phone component so that it can be used to make and receive telephone calls.

17 Claims, 9 Drawing Sheets

(56) References Cited

U.S. PATENT DOCUMENTS

| | | | |
|---|---|---|---|
| 8,725,842 B1 * | 5/2014 | Al-Nasser | 709/219 |
| 9,141,086 B1 * | 9/2015 | Rohrbach | G04B 37/1486 |
| D748,502 S * | 2/2016 | Rapko | D10/30 |
| 9,680,831 B2 * | 6/2017 | Jooste | H04L 63/10 |
| 2001/0043514 A1 * | 11/2001 | Kita | 368/281 |
| 2003/0133515 A1 * | 7/2003 | Kondo | 375/295 |
| 2006/0203621 A1 * | 9/2006 | Brodmann | A44C 5/0092 368/281 |
| 2008/0004510 A1 * | 1/2008 | Tanzawa | A44C 5/0015 600/301 |
| 2008/0318636 A1 * | 12/2008 | Kim | 455/566 |
| 2009/0135680 A1 * | 5/2009 | Rosales | G04B 45/0015 368/242 |
| 2009/0173760 A1 * | 7/2009 | Good | A45F 5/00 224/165 |
| 2009/0207701 A1 * | 8/2009 | Jacques | 368/205 |
| 2010/0029327 A1 * | 2/2010 | Jee | G04G 17/045 455/556.1 |
| 2010/0219943 A1 * | 9/2010 | Vanska et al. | 340/407.1 |
| 2012/0030043 A1 * | 2/2012 | Ross et al. | 705/16 |
| 2012/0087216 A1 * | 4/2012 | Keung | A44C 5/0084 368/282 |
| 2013/0271495 A1 * | 10/2013 | Nguyen et al. | 345/649 |
| 2014/0120983 A1 * | 5/2014 | Lam | 455/557 |
| 2014/0233356 A1 * | 8/2014 | Pattikonda et al. | 368/13 |
| 2014/0362544 A1 * | 12/2014 | Han | G04G 17/06 361/749 |
| 2015/0003210 A1 * | 1/2015 | Joung et al. | 368/10 |
| 2015/0009784 A1 * | 1/2015 | Cho et al. | 368/224 |
| 2015/0029227 A1 * | 1/2015 | Park et al. | 345/659 |
| 2015/0085623 A1 * | 3/2015 | Modaragamage | 368/10 |
| 2015/0181013 A1 * | 6/2015 | Mit | H04M 1/72527 455/556.1 |
| 2015/0185762 A1 * | 7/2015 | Magi | G06F 1/163 361/679.03 |
| 2015/0223355 A1 * | 8/2015 | Fleck | G06F 1/163 361/679.03 |
| 2015/0241852 A1 * | 8/2015 | Yang | G04G 17/08 368/223 |
| 2015/0333302 A1 * | 11/2015 | Johns | H01M 2/1066 429/127 |
| 2015/0362951 A1 * | 12/2015 | Hicks | A44C 5/0015 345/156 |
| 2016/0026156 A1 * | 1/2016 | Jackson | G04G 9/007 368/14 |
| 2016/0026421 A1 * | 1/2016 | Wu | G06F 3/14 345/174 |
| 2016/0062392 A1 * | 3/2016 | Townsend | G06F 1/163 361/679.03 |
| 2016/0266772 A1 * | 9/2016 | Otsuka | G06F 3/0488 |
| 2017/0068225 A1 * | 3/2017 | Chen, Jr. | G04G 19/00 |

FOREIGN PATENT DOCUMENTS

| | | | |
|---|---|---|---|
| JP | 11103912 A | * | 4/1999 |
| KR | 2015007585 | * | 1/2015 |

OTHER PUBLICATIONS

Sugiyama, English Translation for JP 11103912, originally published Apr. 20, 1999, full document.*

Boxall, Andy, "Smartwatch Rumors: We've Got Every Awesome Looking Watch", Feb. 2014, http://www.digitaltrends.com/mobile/best-smartwatch/.

* cited by examiner

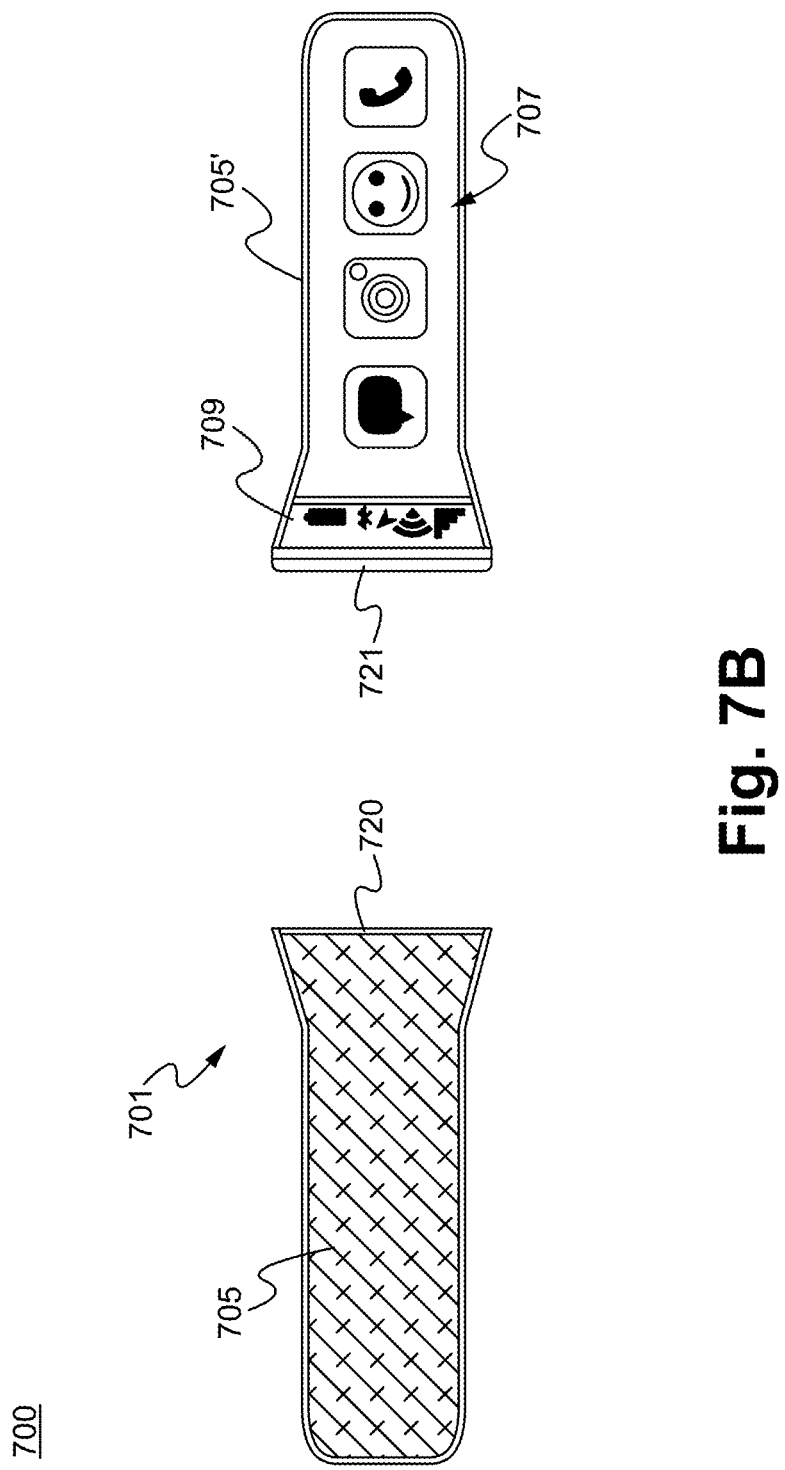

CUSTOMIZABLE SMART WATCH AND HOUSING

FIELD OF THE INVENTION

The present invention is generally directed to wearable electronics. More specifically, the present invention is directed to customizable wearable electronics comprising interchangeable accessories.

BACKGROUND OF THE INVENTION

Wearable electronic devices such as fitness trackers, bluetooth, and computer watches are being developed to increase electronic integration and flexibility for a user. As these electronic devices are developed and combined, a user no longer has to choose between multiple wrist accessories, phones and/or filling their pocket with multiple electronic gadgets. Rather, these elements are being combined and incorporated into one fully integrated electronic device that is wearable on the body or around a user's wrist such as a smart watch. However, current smart watches and electronic accessories often borrow too much from pure consumer electronics. Consequently, the devices are often bulky, uncomfortable and lack the refinement and aesthetically pleasing aspects of a traditional wristwatch or wrist accessory.

SUMMARY OF THE INVENTION

A customizable watch and watch housing integrates the aspects of a traditional watch with the qualities of a smart device. A plurality of different watch faces are removably coupled with the watch and watch housing, thus allowing a user to interchange a watch face depending upon style preference and choice. The watch housing and/or a watch band comprises an interface for controlling one or more computer executable programs stored within a memory module of the watch and comprises a phone component so that it can be used to make and receive telephone calls.

In one aspect, a watch comprises a watch band and a housing coupled to the band, the housing comprising an interface for controlling one or more computer executable programs stored on a memory module of the housing and a cavity for removably receiving a watch face. In some embodiments, the interface comprises a touch screen. In some embodiments, the cavity removably receives a plurality of different watch faces one at a time. In some embodiments, the housing removably couples to the band. In some embodiments, the computer executable programs comprise one or more user chosen and/or preloaded programs. In some embodiments, the watch comprises one or more of a microphone, a camera, a speaker, a headset jack, volume controls, a power button, and a home screen button. The memory module stores a program for controlling a phone of the watch. In some embodiments, the housing is removed from the watch band in order to answer and/or make a phone call. Alternatively, the speaker and microphone is utilized in order to answer and/or make a phone call. In some embodiments, the watch comprises a wireless communication module for communicating with one or more electronic devices. Particularly, the watch can represent all of the functions of a smart phone and/or a computer.

In another aspect, a watch housing comprises a housing body comprising an interface for controlling one or more computer executable programs stored on a memory module of the housing and a cavity for removably receiving a watch face. In some embodiments, the interface comprises a touch screen. In some embodiments, the housing body is oval shaped. The cavity is configured to receive a plurality of different watch faces one at a time. In some embodiments, the watch face comprises one of an analog watch face, a digital watch face, a mechanical watch face and an automatic watch face. In some embodiments, the housing removably couples to a watch band. In some embodiments, the computer executable programs comprise one or more user chosen and/or preloaded programs. In some embodiments, the housing comprises one or more of a microphone, a camera, a speaker, a headset jack, volume controls, a power button, and a home screen button. The memory module stores a program for controlling a phone of the housing. In some embodiments, the housing comprises a wireless communication module for communicating with one or more electronic devices. Particularly, the watch housing can represent all of the functions of a smart phone and/or a computer.

In a further aspect, a watch band comprising of a universal watch housing can be utilized to perform all of the aspects of a smart watch, a smart phone and a computer. A watch band comprises a watch band body comprising an interface for controlling one or more computer executable programs stored on a memory module coupled to the watch band body and a coupling mechanism for removably coupling a watch face with the watch band. In some embodiments, the coupling mechanism comprises one or more watch pins for coupling the watch face with the watch band. Alternatively, the coupling mechanism comprises a housing, which is configured to removably receive the watch face. In some embodiments, the watch band is configured to removably couple with a plurality of different watch faces one at a time. In some embodiments, the watch face comprises one of an analog watch face, a digital watch face, a mechanical watch face and an automatic watch face. In some embodiments, the interface comprises a touch screen. The memory module stores a program for controlling a phone of the watch. In some embodiments, a speaker and microphone is utilized in order to answer and/or make a phone call. In some embodiments, the watch comprises a wireless communication module for communicating with one or more electronic devices.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIGS. 7A and 7B illustrate a top side view of a watch band in accordance with some embodiments.

DETAILED DESCRIPTION OF THE EMBODIMENTS

Embodiments of the invention are directed to a watch and watch housing which integrates two wearables. The watch housing comprises a cavity for removably coupling with a plurality of different watch faces thus allowing a user to interchange the watch face depending upon style preference and choice. The housing comprises a screen for controlling one or more computer executable programs stored within a memory module of the housing and comprises a phone component so that it can be used to make and receive telephone calls.

Reference will now be made in detail to implementations of a customizable watch and watch housing as illustrated in the accompanying drawings. The same reference indicators will be used throughout the drawings and the following detailed description to refer to the same or like parts. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
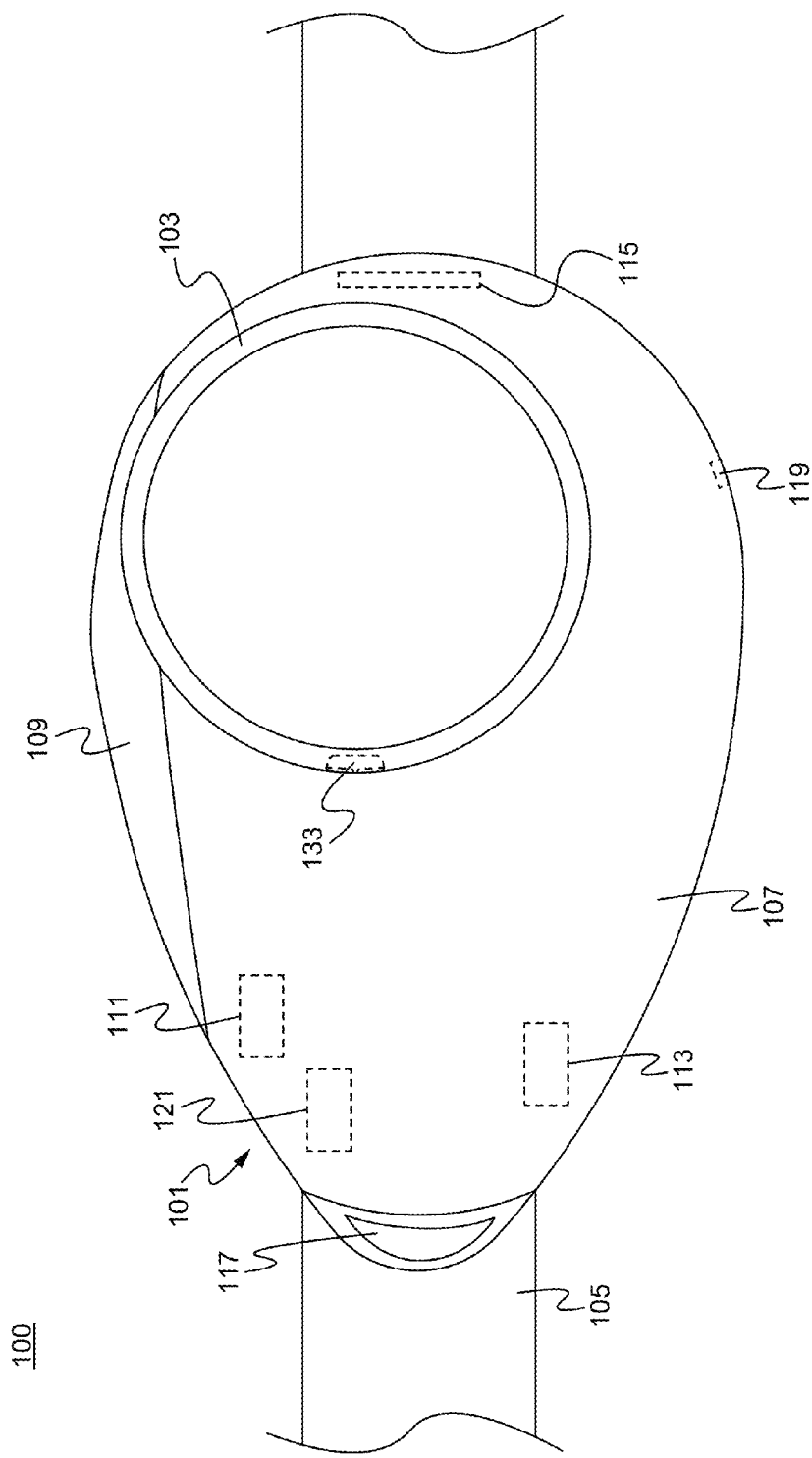
FIG. 1A illustrates a top side view of a wearable watch in accordance with some embodiments.

Referring now to FIG. 1A, a customizable watch and watch housing is depicted therein. The watch 100 comprises a watch band 105, and a watch housing 101 coupled to the watch band 105. In some embodiments, the watch housing 101 is removably coupled to the watch band 105 so that a user is able to use multiple different watch bands 105 with the housing 101. Particularly, the watch housing 101 is able to removably couple with the watch band 105 by any appropriate mechanism as known in the art. For example, in some embodiments the watch housing 101 removably couples to the watch band 105 by a snap or twist fastener. Alternatively, in some embodiments, the watch band 105 is slid through an aperture within an underside of the watch housing 101. The watch band 105 is able to comprise any appropriately desired material including, plastic, leather, metal and cloth.

The watch housing 101 comprises an interface 107, a memory module 111 and a cavity 103. The cavity 103 is configured for receiving a plurality of different watch faces, one at a time. As shown within FIG. 1A, in some embodiments, the watch housing 101 comprises an oval or banana leaf-like shape, with a broad front and narrow back. This enables the watch housing 101 to comfortably fit the wrist of a user while still retaining 74% of the surface area of a typical rectangular shaped smart watch. As further shown with FIG. 1A, in some embodiments, the cavity 103 is a round shape cavity on an upper right side of the watch housing. In these embodiments, the round shape cavity 103 enables the housing 101 to removably couple with a typical round watch face. Consequently, the housing 101 can retain much of the typical feel and look of a traditional round watch face. Additionally, although the housing 101 is coupled to the watch band 105 in a parallel or vertical orientation, the housing 101 is able to be coupled to the watch band 105 in a perpendicular or horizontal orientation. Further, in some embodiments, the housing 101 is movable to an orientation on a wrist as desired by a user.

Moreover, although a round shape cavity 103 is shown within FIG. 1A, the housing 101 is able to comprise a differently shaped cavity 103 in order to removably couple with differently shaped watch faces. For example, in some embodiments, the cavity 103 comprises a rectangular or square shape. In some embodiments, the cavity 103 removably couples with one of an analog watch face, a mechanical watch face, and an automatic watch face. However, the watch face is can comprise any appropriately sized watch face. In some embodiments, the cavity 103 comprises a diameter of 38 mm. However, the cavity 103 can be sized in to fit any appropriately sized watch face. The cavity 103 can be adapted to secure the watch face with friction. Alternatively, the watch face can be secured with a snap fitting or a twist fitting. Still further alternatively, the watch housing 101 can include a latch 133 that affirmatively holds the watch face in place.

Figure 1B:
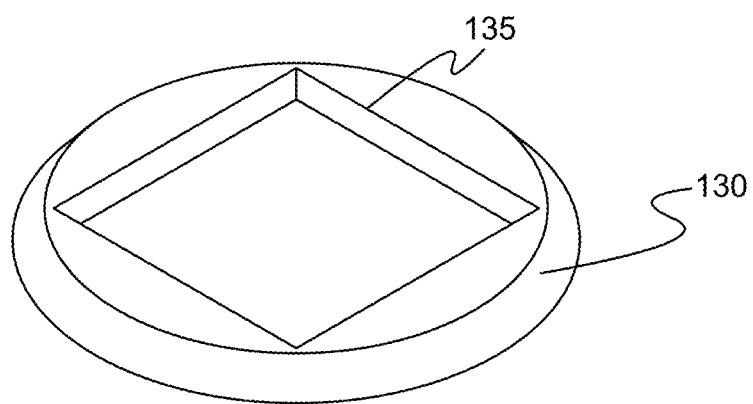
FIG. 1B illustrates an adapter for a watch housing in accordance with some embodiments.

It is possible that a user will want to selectively attach watch faces of differing sizes, differing profiles or differing shapes to a single watch housing 101. To accommodate such a variety of watches, an adapter 130, such as shown in FIG. 1B is configured for insertion into the cavity 103. In this embodiment, the cavity 103 is sized to receive the largest sized watch and the adapter 130 is sized to receive differently sized watch faces. An exterior surface of the adapter 130 is sized to be received by the cavity 103. An interior surface of the adapter is sized to receive a different watch, which may have a smaller size, a different profile, or be a different shape. For example, as shown in FIG. 1B, the interior surface comprises a square shape 135. However, the interior surface is able to comprise any appropriately desired shape, such as octagonal, square and rectangular, among many other choices. The cavity 103 can be adapted to secure the adapter 130 with friction. Alternatively, the adapter 130 can be secured with a snap fitting or a twist fitting. Still further alternatively, the watch housing 101 can include the latch 133 that affirmatively holds the adapter 130 in place. Additionally, the adapter 130 can be adapted to secure the watch face with friction. Alternatively, the watch face can be secured with a snap fitting or a twist fitting. Still further alternatively, the adapter 130 can include a latch that affirmatively holds the watch face in place.

In some embodiments, the interface 107 comprises a touchable and/or tactile screen. For example, in some embodiments, the interface 107 is manipulated and/or an icon is moved in order to control the watch housing 101. In some embodiments, the interface 107 comprises a crystal sapphire display. Particularly, the interface 107 can comprise any appropriately desired interface for controlling the watch and watch housing 101.

The memory module 111 is configured for storing one or more computer executable programs, which are controlled by the interface 107. For example, in some embodiments the memory module stores one or more of an e-mail application, an application for the management of tasks such as a calendar, a health monitoring application, an instant or text messaging application, a personal safety application, a sports and/or sports training application, a smart home application, a social networking application, a security or access control application, an online payment application, a gaming application, a photography application, and a media and entertainment application, such as a music application and a video application. Particularly, the memory module 111 is able to store any appropriate computer executable application as desired. In some embodiments, the one or more applications are downloadable to the memory module 111. The housing 101 is able to comprise any appropriate memory and processor capable of storing and executing the desired applications.

In some embodiments, a notifications bar 109 informs the user of a status of the one or more applications, and or a battery status of the watch housing 101. In some embodiments, the watch housing 101 comprises a micro usb charging port for charging a battery of the housing. However, a battery of the housing 101 is able to be charged and/or replaced by any appropriately desired method.

In some embodiments, the memory module 111 also stores a program for controlling a phone. A user is able to utilize the interface 107, a microphone 113 and a speaker 115 in order to make a phone call. In some embodiments, the housing 101 is removed from the watch band 105 in order to make and/or receive a telephone call. In some embodiments, a user is able to use the microphone 113 in order to control the one more programs stored within the memory module 111 using voice controls.

As further shown in FIG. 1A, in some embodiments, the housing 101 comprises a headphone jack 119 for removably coupling with a set of headphones. In further embodiments, the housing 101 comprises a wireless communication module 121 for wirelessly communicating with one or more electronic devices. For example, in some embodiments, the wireless communication module 121 is able to communicate and/or share content with an electronic device such as a car stereo and a computing device such as a tablet.

Figure 2:
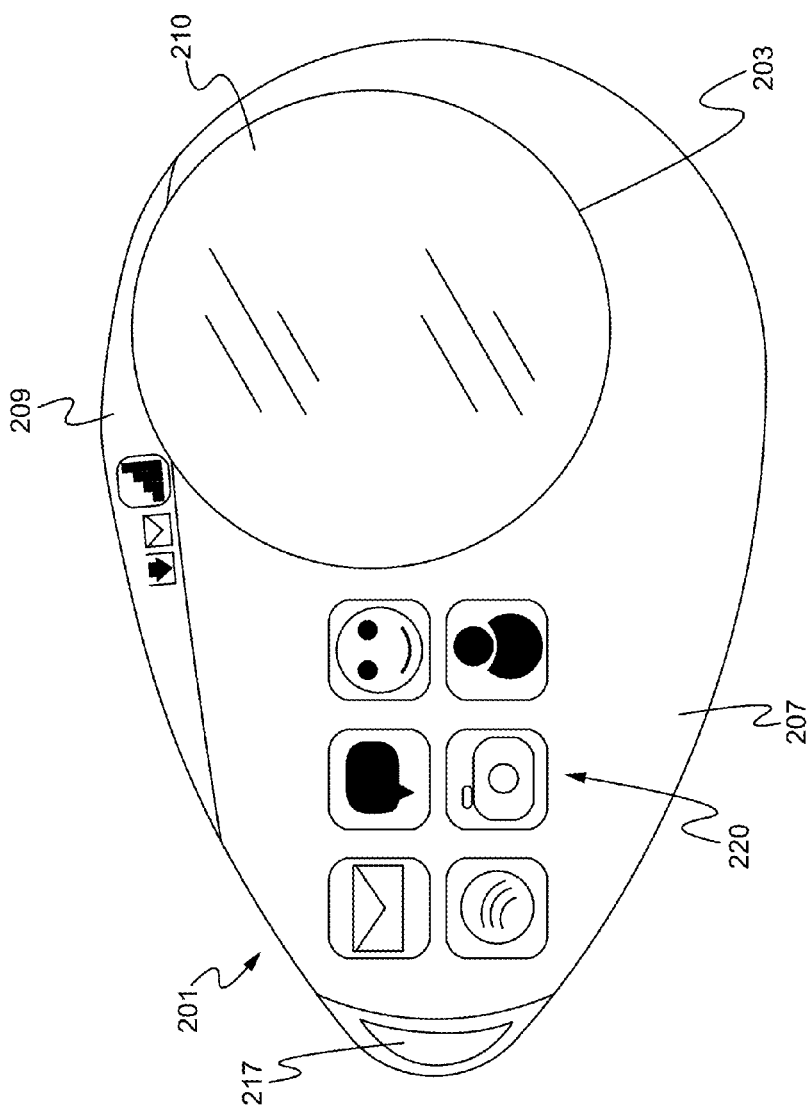
FIG. 2 illustrates a top side view of a watch housing in accordance with some embodiments.

FIG. 2 illustrates a top side view of a watch housing in accordance with some embodiments. The watch housing 201 is similar to the watch housing 101 as described above, and comprises a an interface 207 and a cavity 203 for removably coupling with a plurality of different watch faces, one at a time. As shown within FIG. 2, a round watch face 210 is removably coupled with the cavity 203. In some embodiments, the watch face 210 is snap fit into the cavity 203, however, the watch face 210 is able to removably couple with the cavity 203 by any appropriate mechanism as known in the art. For example, in some embodiments, the watch face 210 is coupled with an adapter before it couples with the cavity 203.

As further shown within FIG. 2, one or more icons 220 corresponding to the one or more applications of the housing 201 are visible on the interface display 207. A user is able to manipulate the one or more icons 220 in order to operate and manage the one or more applications. The notifications bar 209 informs the user of a status of the one or more applications, and or a battery status of the watch housing 201. In some embodiments, a home button 217 on the housing 201 returns a user to a home screen of the interface 207.

Figure 3:
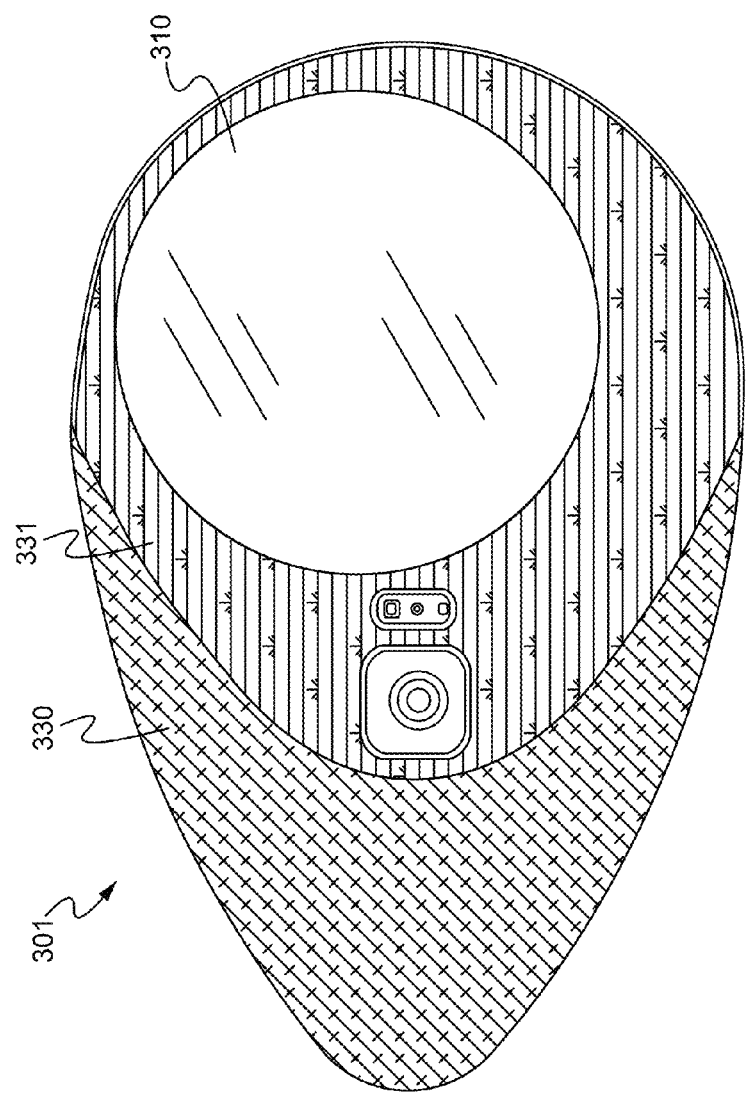
FIG. 3 illustrates a bottom side view of a watch housing in accordance with some embodiments.

FIG. 3 illustrates a bottom side view of a watch housing in accordance with some embodiments. The watch housing 301 is similar to the watch housing 101 as described above. As shown within FIG. 3, in some embodiments, the watch housing 301 comprises a camera 330 and a camera flash. The camera 330 is able to comprise any appropriately desired camera as known in the art. For example, in some embodiments, the camera comprises a video camera.

As further shown in FIG. 3, in some embodiments, the cavity passes through the housing 301 such that a bottom of the watch face 310 is viewable. Alternatively, in some embodiments, the housing comprises a bottom underneath the cavity and the watch face 310 rests against a bottom of the housing 301.

Figure 4:
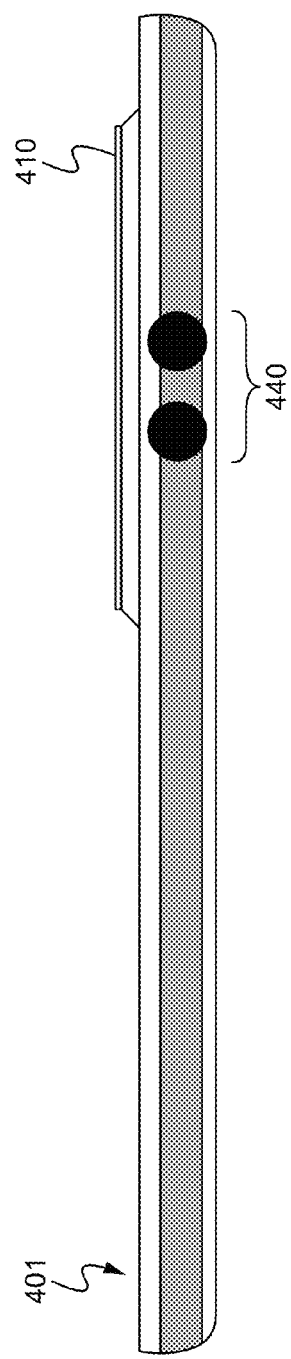
FIG. 4 illustrates a side view of a watch housing in accordance with some embodiments.

As shown within FIG. 4, a volume control 440 is able to adjust a volume of the speaker and/or sound connected to the housing 401, as described above. In some embodiments, when a watch face 401 is coupled with the housing 401, the watch face 410 is raised slightly above the housing 401. This enables a user to manipulate an outside dial of the watch. Alternatively, in some embodiments, when the watch face is coupled with the housing, the watch face 410 is flush to the housing 401.

Figure 5:
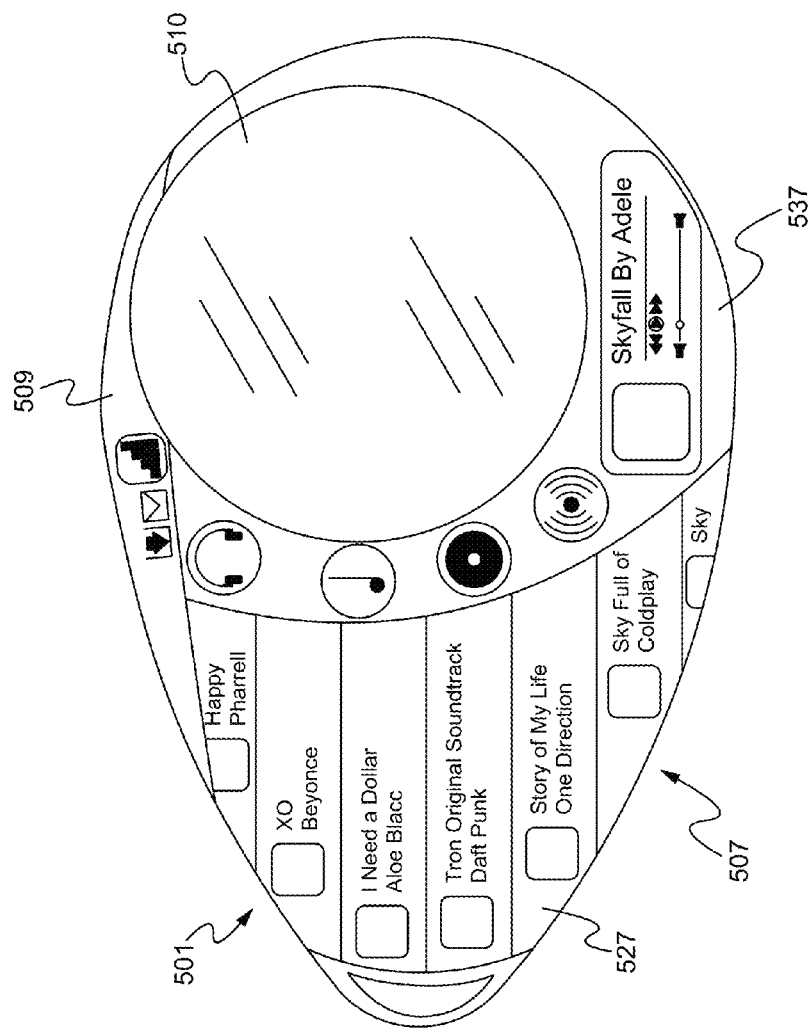
FIG. 5 illustrates a top side view of a watch housing in accordance with some embodiments.

FIG. 5 illustrates a top side view of a watch housing in accordance with some embodiments. As shown within FIG. 5, the watch housing 501 is running a program on the interface 507 of the watch housing 501. The interface 507 is divisible into one or more sections 527 and 537. For example, in some embodiments, the section 527 is able to display a program list while the section 537 displays one or more controls for running the program. Although only two windows are shown on the interface 507, any number of windows are able to be displayed in order to run a stored program.

Figure 6:
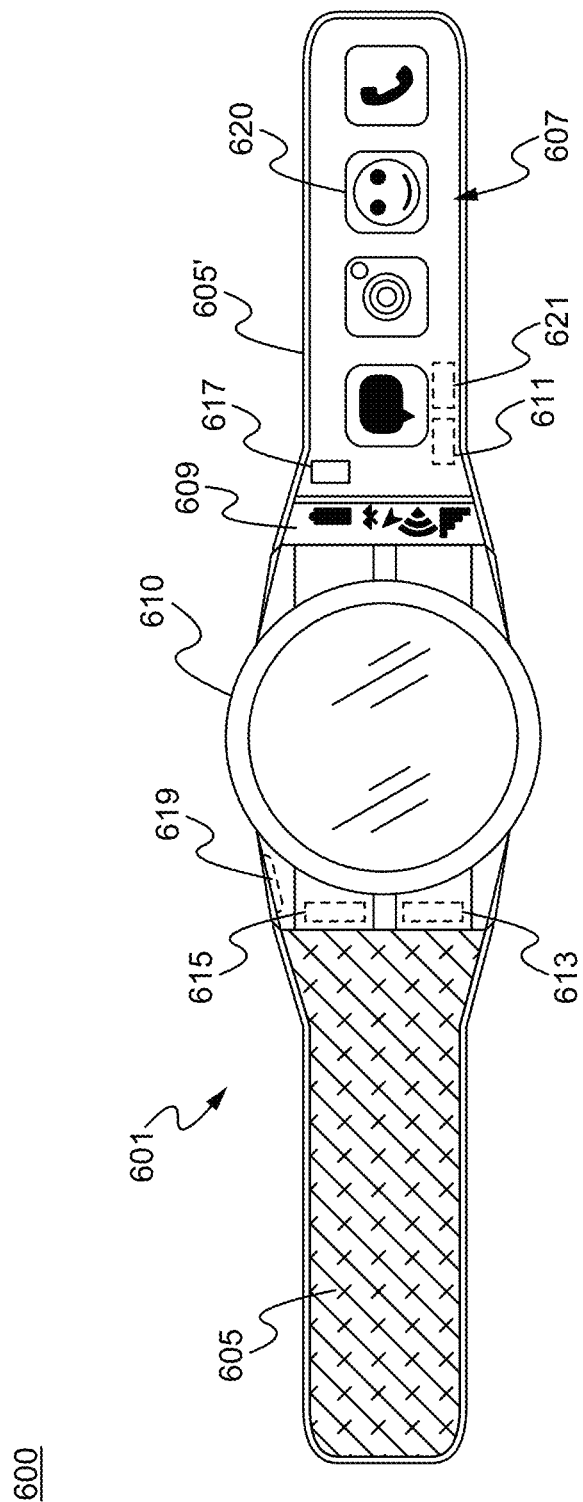
FIG. 6 illustrates a top side view of a wearable watch in accordance with some embodiments.

Referring now to FIG. 6, a watch band is shown coupled with a watch face in accordance with further embodiments. The watch band 600 comprises a watch band body 601 with a first side 605, a second 605' and an interface 607 for controlling one or more computer executable programs stored within a memory module 611 of the watch band body 601. In some embodiments, the interface 607 comprises a touch screen.

As described in relation to the memory module 111 above, the memory module 611 is configured for storing one or more computer executable programs, which are controlled by the interface. As described above, the memory module is able to store any appropriate computer executable application as desired. In some embodiments, the one or more applications are downloadable to the memory module. The watch band body 601 is able to comprise any appropriate memory and processor capable of storing and executing the desired applications.

In some embodiments, a notifications bar 609 informs the user of a status of the one or more applications, and or a battery status of the watch band body 601. In some embodiments, the watch band body 601 comprises a micro usb charging port for charging a battery of the watch band. However, a battery of the watch band body 601 is able to be charged by any appropriately desired method.

As shown within FIG. 6, the interface 607 is located on the second side 605' of the watch band body 601. In some embodiments, when the interface 607 is located on the second side 605' of the watch band body 601, the circuitry and electronic components of the watch band 600 are located on the first side 605 of the watch band body 601. In some embodiments, the interface 607 is located on the first side 605 and the second side 605' of the watch band body 601. This enables the watch band 600 to remain slim, similar to a conventional watch wrist band and remain comfortable on a user's wrist.

In some embodiments, the memory module 611 also stores a program for controlling a phone. A user is able to utilize the interface 607, a microphone 613 and a speaker 615 in order to make a phone call. In some embodiments, a user is able to use the microphone 615 in order to control the one more programs stored within the memory module 611 of the watch band 600.

As further shown in FIG. 6, in some embodiments, the watch band 600 comprises a headphone jack 619 for removably coupling with a set of headphones. In further embodiments, the watch band 600 comprises a wireless communication module 621 for wirelessly communicating with one or more electronic devices. For example, in some embodiments, the wireless communication module 621 is able to communicate and/or share content with an electronic device such as a car stereo and a computing device such as a tablet.

Figure 7A:
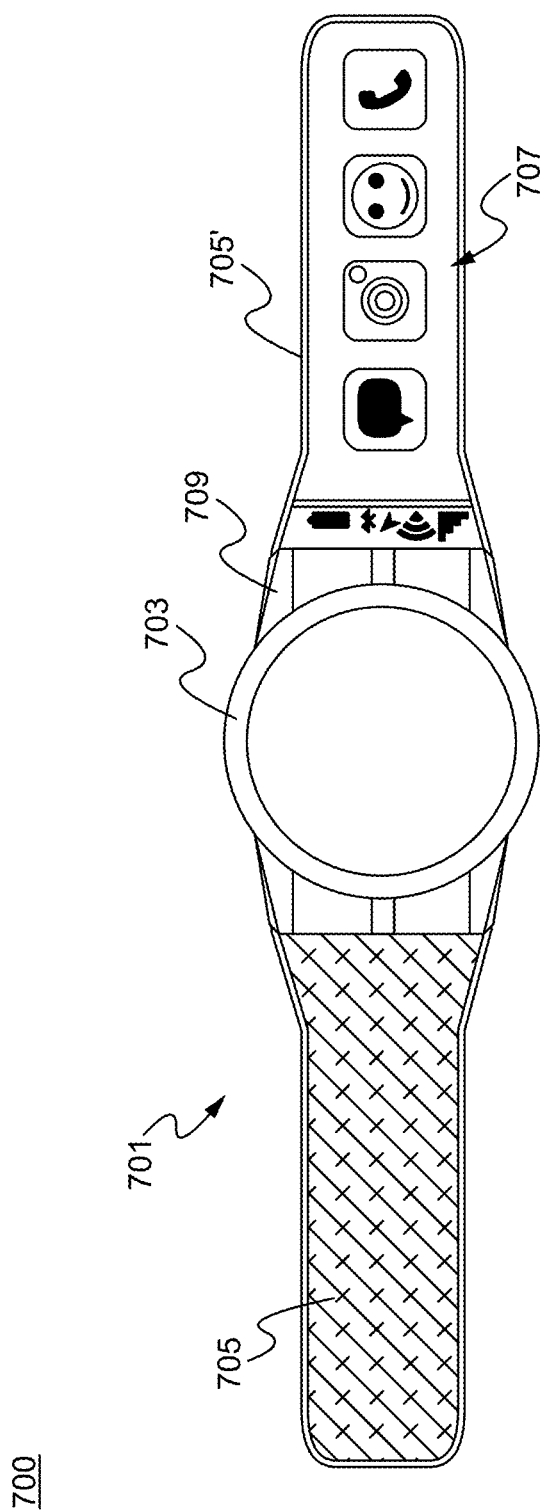

As shown within FIG. 6, a round watch face 610 is removably coupled with the watch band 600. In some embodiments, as shown within FIG. 7A, the watch face 610 is snap fit into a cavity 703 such as described above. In some embodiments, the cavity 703 comprises a diameter of 38 mm. However, the cavity can be sized in to fit any appropriately sized watch face. Alternatively, in some embodiments, as shown in FIG. 7B, the watch face 610 removably couples to the watch band body 601 by coupling with pin 720 of the first side 705 of the body 701 and a pin 720' of the second side 705' of the body 701. However, the watch face 610 is able to removably couple with the watch band by any appropriate mechanism as known in the art.

Additionally although a round watch face 610, is shown, the band 600 is able to removably couple with differently shaped watch faces. For example, in some embodiments, the watch face comprises a rectangular or square shape. In some embodiments, the watch band 600 removably couples with one of an analog watch face, a mechanical watch face, and an automatic watch face. The watch band 600 is able to comprise any appropriately desired material including, plastic, leather, metal and cloth.

One or more icons 620 corresponding to the one or more applications of the watch band 600 are visible on the interface display 607. A user is able to manipulate the one or more icons 620 in order to operate and manage the one or more applications. The notifications bar 609 informs the user of a status of the one or more applications, and or a battery status of the watch housing 601. In some embodiments, a home button 617 on the housing 601 returns a user to a home screen of the interface 607. In some embodiments, the watch band 600 comprises a volume control for adjusting a volume of the speaker 615 and/or a headset operatively connected to the watch band 600. The headset can be coupled to the watch band 600 via a wire and jack or wirelessly, such as through a bluetooth connection. In further embodiment, the watch band 600 comprises a camera, such as described above.

In use, the customizable smart watch and housing enables a user to interchange a watch face depending upon the user's preference's in style and choice of watch company. Particularly, any appropriately sized watch face can be used with the watch housing and band in order to create a customized and elegant look for the user. Additionally, the "smart aspects" of the housing and watch band such as the phone capabilities and programs allow the user the added flexibility of an integrated wearable device. For example, a user can play music, text, check social media, take pictures, and make phone calls all from a wrist device. Particularly, with the customizable smart watch housing and band, the user is afforded to best of both worlds, a smart watch which can take the place the vital aspects of a phone, and a watch face and style which retains the qualities of a traditional wrist watch. As such, the customizable smart watch and housing as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically it will be apparent to someone of ordinary skill in the art that the invention is able to be used with any appropriate watch face and encompass different housing and watch band designs.

What is claimed is:

1. A two-strap watch band comprising:
   a. a first side having a length comprising a first end of the first side and a second end of the first side, the first end of the first side removably coupled to a watch face;
   b. a second side having substantially the same length to the first side comprising a first end of the second side and a second end of the second side, the first end of the second side removably coupled to the watch face, wherein the second end of the first side removably couples with the second end of the second side to couple around a user's wrist, wherein the second side comprises:
      i. a control unit embedded within the second side;
      ii. a touch screen electronic display along substantially an entire length of the second side, the touch screen electronic display located only on the second side of the watch band; the touch screen electronic display further comprising:
         1. an interface comprising a plurality of icons corresponding to a plurality of computer executable programs stored on a memory module of the watch band; and
         2. a notifications bar for notifying the user of a signal strength and battery charge of the watch band; wherein the notifications bar is located on the second side at the side of the touch screen electronic display closest to the watch face.

2. The watch band of claim 1, wherein the watch band is capable of being interchangeable with a plurality of different watch faces.

3. The watch band of claim 1, wherein the watch face comprises one of an analog watch face, a digital watch face, a mechanical watch face and an automatic watch face.

4. The watch band of claim 1, wherein the memory module stores a program for controlling a phone of the watch.

5. The watch band of claim 4, wherein a speaker and microphone is utilized in order to answer and/or make a phone call.

6. The watch band of claim 1, wherein the watch band comprises a wireless communication module for communicating with one or more electronic devices.

7. The watch band of claim 1, wherein the watch face couples to the watch band with a snap fit.

8. The watch band of claim 1, wherein the watch face couples to the watch band by a twist fit.

9. The watch band of claim 1, wherein the electronic display comprises an icon for telephone calls and the watchband further includes a microphone and a speaker for making telephone calls.

10. The watch band of claim 9, further including a wireless communication module for communicating with an external electronic device.

11. The watch band of claim 1, further comprising a headphone jack.

12. A watch band comprising:
   a. a first watch band strap having a length comprising a first mechanical coupling mechanism for coupling to a first side of a watch body;

b. a second watch band strap having substantially the same length as the first watch band strap comprising a second mechanical coupling mechanism for coupling to a second side of the watch body, wherein the first watch band strap and the second watch band strap join together to couple around a user's wrist;

c. a control system formed in the second watch band strap, the control system including a processor and a memory configured for storing and executing a plurality of applications; and d. an electronic display formed along substantially an entire length of the second watch band strap; the electronic display located only on the second watch band strap, wherein the electronic display includes a display configured to show a plurality of icons, each icon representing an application, and to separately show a notifications bar for showing a strength of communication signals, charge of a battery and whether at least one communication protocol is active; wherein the notifications bar is located on the second watch band strap at the side of the electronic display closest to the watch body, wherein the display is a touch screen adapted to select and control operation of each application.

13. The watch band of claim 12, wherein the watch band is configured to communicate with a headphone for communicating with a user.

14. The watch band of claim 12, wherein the watch band includes a microphone, such that the watch band can be used as a telephone interface for the user allowing the user to answer and/or make a phone call.

15. The watch band of claim 14, wherein the watch band comprises a wireless communication module for communicating with one or more electronic devices.

16. The watch band of claim 15, wherein the watch band selectively communicates with the headphones wirelessly or with a wire.

17. The watch band of claim 15, wherein the first mechanical coupling mechanism and the second mechanical coupling mechanism each comprise a watch pin mechanism.

\* \* \* \* \*